United States Patent [19]

Naumann

[11] Patent Number: 5,511,913
[45] Date of Patent: Apr. 30, 1996

[54] WHEELSET PROCESSING METHOD AND APPARATUS

[75] Inventor: Hans J. Naumann, Albany, N.Y.

[73] Assignee: Niles-Simmons Industrieanlagen GmbH, Chemnitz, Germany

[21] Appl. No.: 228,659

[22] Filed: Apr. 18, 1994

[30] Foreign Application Priority Data

May 13, 1993 [DE] Germany ............................ 43 16 697.0

[51] Int. Cl.⁶ ........................................ B23C 3/00
[52] U.S. Cl. ..................... 409/131; 82/105; 409/158; 409/165; 409/169; 451/258
[58] Field of Search ..................... 409/131, 132, 409/158, 165, 169; 451/258, 28; 82/104, 105

[56] References Cited

U.S. PATENT DOCUMENTS

| | | | |
|---|---|---|---|
| 1,533,703 | 4/1925 | Johnson | 409/158 |
| 2,546,225 | 3/1951 | Julian et al. | 82/105 |
| 2,605,591 | 8/1952 | Hill | 451/258 |
| 2,626,492 | 1/1953 | Balsiger | 451/258 |
| 3,598,017 | 8/1971 | Saari | 409/165 |

FOREIGN PATENT DOCUMENTS

| | | |
|---|---|---|
| 0491067A1 | 6/1992 | European Pat. Off. . |
| 1061512 | 4/1954 | France ................... 409/165 |
| 566201 | 9/1952 | Germany . |
| 1477587 | 12/1963 | Germany . |
| 2063074 | 12/1970 | Germany . |
| 2937751A1 | 9/1979 | Germany . |
| 3012997A1 | 4/1980 | Germany . |
| 3931747A1 | 4/1991 | Germany . |
| 4001793C1 | 7/1991 | Germany . |

Primary Examiner—Daniel W. Howell
Attorney, Agent, or Firm—Heslin & Rothenberg

[57] ABSTRACT

In a wheelset processing operation, in which non-positive driving of the wheelset (1,1') is effected, the processing tools (2,2') act on the wheelset (1,1') at the same time in different directions such that the tangential components (3,3') of the tool forces are substantially compensated. This enables the wheelset processing time to be reduced and enables the machining accuracy to be improved.

15 Claims, 2 Drawing Sheets

WHEELSET PROCESSING METHOD AND APPARATUS

FIELD OF THE INVENTION

This invention relates to a wheelset processing method and a wheelset processing facility with rotating tools and a non-positive wheelset drive for processing wheelsets of rail vehicles.

BACKGROUND OF THE INVENTION

These methods and facilities are characterized in by the kind of transmission of the driving forces required for this process. The two main principles of transmission are the positive and the non-positive transmission. With the underfloor processing method, generally the non-positive drive is used. The efficiency of a wheelset processing facility with a non-positive drive of the wheel is mainly determined by how it is managed to transfer the driving forces onto the wheelsets. The simpliest way to increase the driving forces that may be transmitted is to increase the pressing force (normal force) of the friction rollers concerned. However, high normal forces result in an unadmissible excursion of the wheelset centre line away from the processing rotation axis.

Another way is to minimize the slip between friction roller and wheelset. In this direction, intensive work on the improvement of wheelset processing methods and wheelset processing facilities has been done for many years (DE-PS 14 77 587, DE-AS 20 63 074, DE-OS 29 37 751, DE-PS 30 12 997). With the DE-OS 39 31 747, the weight of the wheelset is optimized by allocation of friction roller and tool one to another and to the straining line. Apart from that, there are proposals aimed to increase the number of friction rollers. That results in a load distribution but does not help to abolish the a/m problems resulting from the non-positive drive.

In order to use the limited friction forces between the wheelset and the friction rollers, later the same inventor found with the EP 491 067 a method for limiting a slip (and, in addition, with the PS 40 01 793, a method for determing the slip) for this processing task. With this method, the slip between the friction roller and the driven wheelset is permanently measured; when the preset upper limit value of the slip is reached, the cutting cross section of the tool is reduced by appropriate control technological measures, and when the preset lower limit value of the slip is reached, the chip cross section is increased again. In this sense, this instruction is—particularly when the level of technology cited there is complied with—an optimizing instruction for processing at the critical border.

However, all these proposals have the disadvantage that the resulting tangential components of the tool forces onto the wheelset are not reduced and hence further must be transferred by the friction rollers with full power.

It is also the general level of technology that with underfloor wheelset processing machines with bearing box centering, load facilities for increasing the normal force are required during the processing operation. For this reason, with underfloor wheelset lathes outer and/or inner holding down appliances are provided to additionally reduce the small space available at the wheelset.

The use of several tools (lathe chisel or milling cutter) is generally known also for the field of application 'wheelset processing'.

In DE-PS 14 77 587, two lathe chisels displaced by 180° are used. That ensures that the tool force components produced by every individual tool onto the wheelset partially compensate one to another. The only disadvantage with this solution is that the components of the tangential forces of the tools add up.

With the DE-PS 5 66 201/H9870 1b/49b, a wheelset milling machine fitted with several milling cutters for processing wheelsets is provided. With this project, every milling cutter has different processing tasks (tread and flange as well as rim). The driving tongues at the faceplates of the spindle heads drive the wheelset mounted in the centres with a positive drive. The profile roller cutters for tread and flange processing have each the same direction of rotation, and the double-face cutters for rim side processing work in counterdirection. The different processing tasks, different processing depths and different processing speed result in differences between the tool force components. Also the separate processing of wheel profile and face side result in differences in the tool force components, which assessment and effect are not the object of the invention. Thanks to the fact, that this wheelset milling machine processes wheelsets in the removed condition, the problems of power transmission (as with the non-positive drive) did not occur.

The problems of slip reduction must be considered only with non-positive drives. But also other wheel processing methods that have become popular until now stop with the compensation of the deforming tool forces and did not see the possibility of compensating the components of the tangential forces of the individual tool forces acc. to direction and amount and the efficient utilization of the driving forces produced by non-positive friction rollers, which resulted from the use of rotating tools.

However, the separate existence of solutions with rotating tools on the one hand, and the existence of problems with the transmission of forces with non-positive drives on the other hand, failed to result in the conclusion that with the use of rotating tools running in counterdirection with a non-positive drive the existing load transmission problems with this kind of drive could be solved.

The aim of the invention is a wheelset processing method and a wheelset processing facility of the kind mentioned in the beginning, mainly for underfloor processing, that render the possibility to increase the efficiency of the cutting operation without essential increase of the driving forces of the friction rollers, that provide a reduction of the normal forces required to produce the friction forces and thus permit also the lack or at least the reduction of additional load facilities, and together with that, obtain a reduction of the deformation at the wheelset and an improvement of the machining accuracy.

It is the task of the invention to provide a wheel processing method and a wheel processing facility that approximately compensate the forces produced by the rotating tools onto the wheelset in tangential direction.

SUMMARY OF THE INVENTION

According to the invention, at a wheelset processing machine with a non-positive drive of the wheelset with at least two rotating processing tools, the task is solved in such a way that at a wheelset two or several rotating tools producing their machining forces onto the wheelset act in one level onto at least one separate processing point at the workpiece in counterdirection in such a way, that the direction and the amount of the tangential forces and thus the moments of these forces round the wheel centre are compensated as much as possible and that thus only the remaining residual moment of the machining forces must be transferred via the frictional connection of the friction rollers.

According to the invention, at a wheelset processing facility with at least two rotating processing tools positioned by supports and fitted with a non-positive drive of the wheelset, this task is solved in such a way that two or several rotating tools positioned by supports and with nearly the same producing cutting force but running in the opposite direction one to another are arranged either at one single wheel of the wheelset or at both wheels of a wheelset to carry out the cutting operation. When using more then two tools, it goes without saying that the total of the cutting forces of all tools running in one and the same direction of rotation must be approximately the same as the total of the cutting forces in the opposite direction.

Another preferred embodiment of the invention is characterized in that the rotating tools have a defined cutting edge.

Another preferred embodiment of the invention is characterized in that the rotating tools have a non-defined cutting edge.

Another preferred embodiment of the invention is characterized in that the profile to be produced is completely, partly or not stored in the rotating tools.

Figure 1:
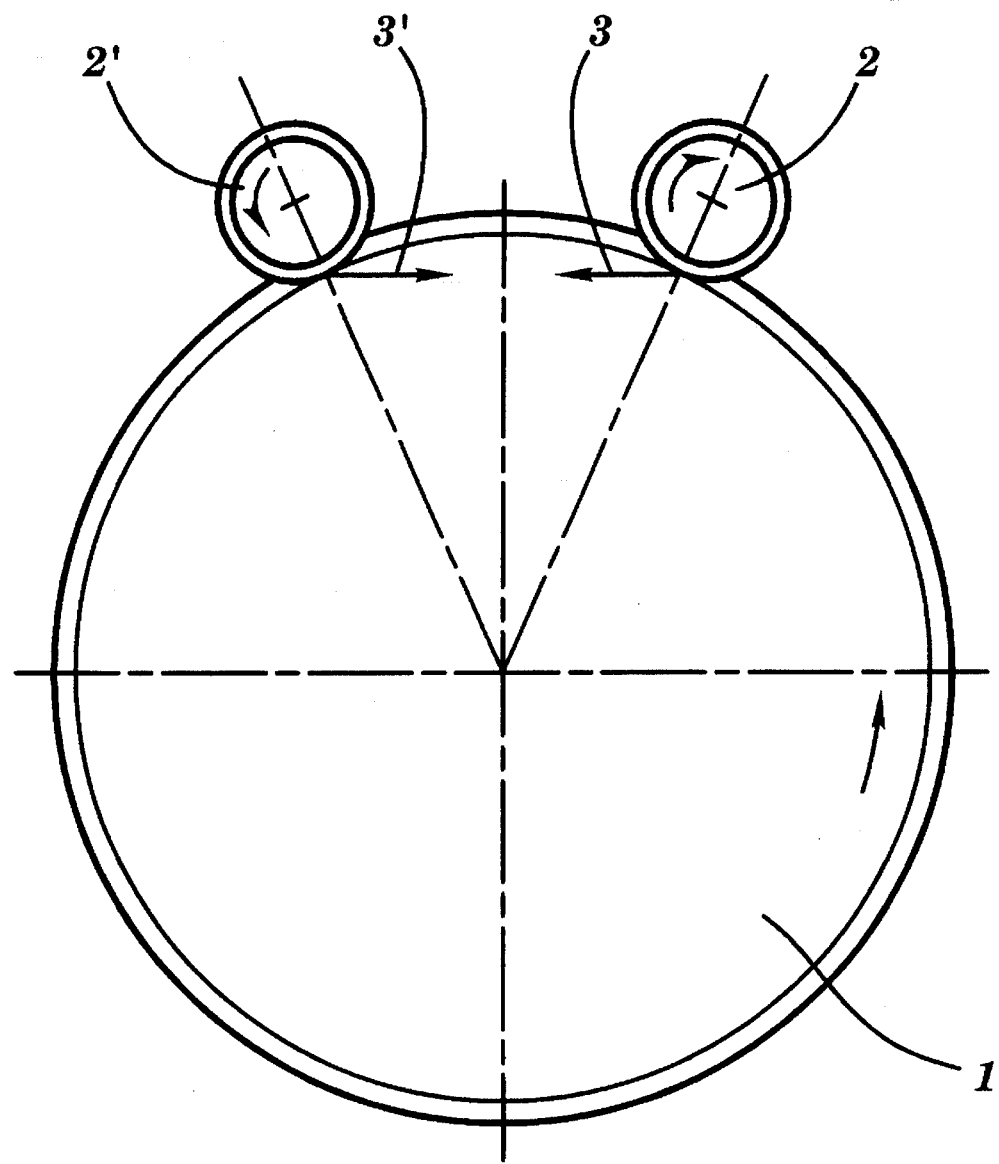
FIG. 1 shows the principal design of an underfloor wheelset processing facility

The following symbols are used:

1 wheel
1' wheel
2 milling cutter
2' milling cutter
3 component of the tangential force
3' component of the tangential force
4 friction roller
4' friction roller
5 axle lcad (including, without or with reduced force of the lcad facility)
5' axle lcad (including, without or with reduced force of the lcad facility)
6 normal force onto the friction roller
6' normal force onto the friction roller
7 driving force
7' driving force
8 support
8' support
9 centring means
9' centring means

DETAILED DESCRIPTION OF THE PREFERRED EMBODIMENTS

Figure 2:
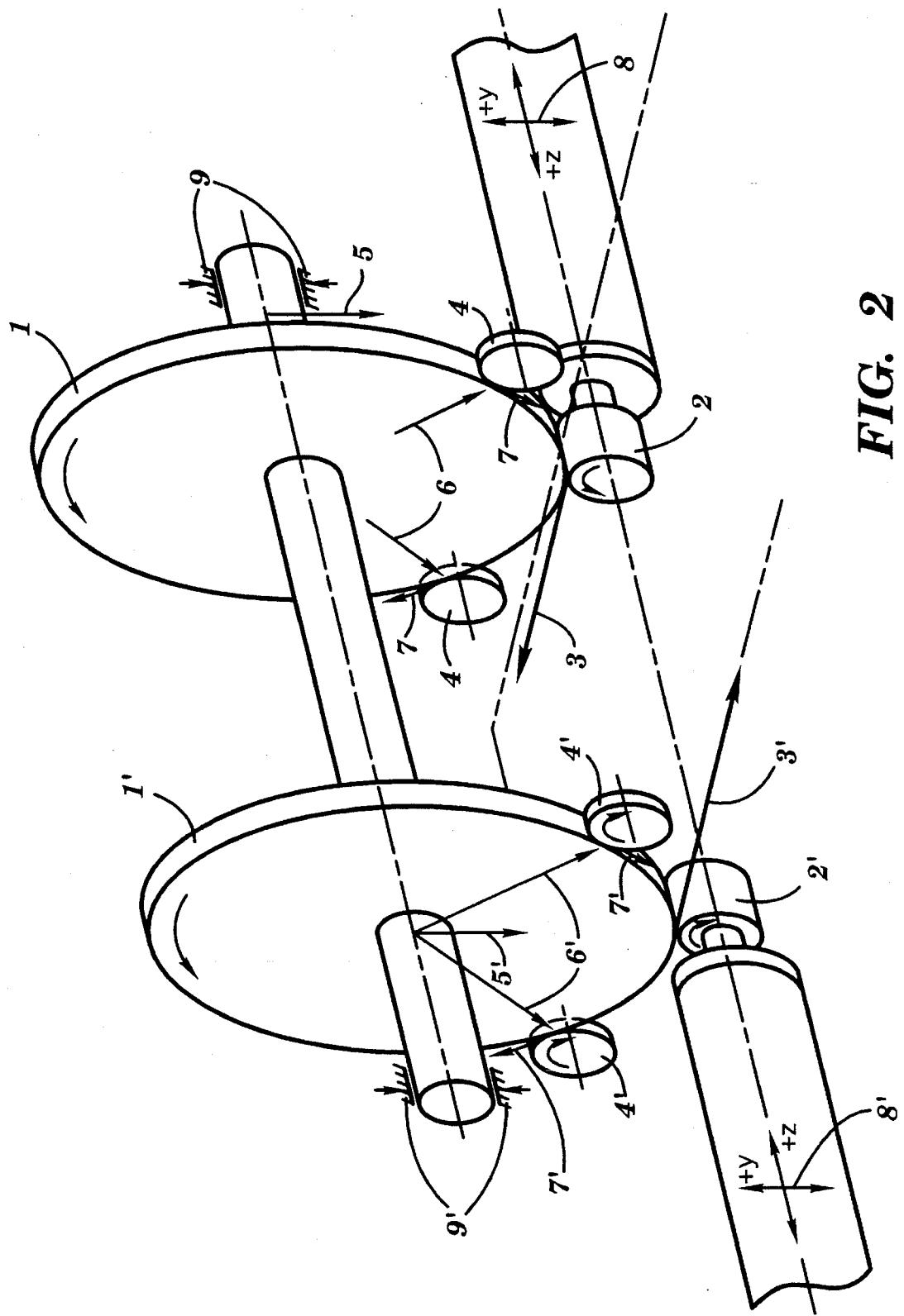
FIG. 2 shows the tangential forces and moments at the wheel of a wheelset when processed.

At a wheelset processing machine for underfloor processing, the wheelset is relieved of the load, centred and driven by the friction rollers 4 and 4' for processing acc. to FIG. 2. The frictional connection between the friction rollers and the wheel limits the technically possible machining forces. FIG. 2 shows the principal constructive design of an underfloor wheelset processing facility with the milling cutters 2, 2'. The same effects are achieved with other rotating tools, e.g. with grinding wheels. These may be positioned by the supports 8, 8'. The wheelset centered in the centring means 9, 9' is driven by the friction rollers 4, 4'. Acc. to the invention, at least two rotating tools, preferably milling cutters 2, 2', with nearly the same producing cutting force at the wheelset but in counterdirection are in the mesh at the same time.

As shown in FIG. 2, these tools are arranged in such a way that with the same feed direction of the wheelset, the moments round the wheel centres of the components of the tangential forces 3, 3' of the machining forces annul themselve to a maximum degree. During this process, the milling cutter 2 carries out a synchronous milling operation at wheel 1, and at the same time the milling cutter 2' carries out an ordinary milling operation at wheel 1', thus reducing the required driving forces 7 and 7'. For this reason, the normal forces 6, 6' that result from the axle load 5, 5' and have to transmit only the residual moment remaining from the machining forces may be low. Thus, any additional forces from the load facility are not necessary, or these forces may be reduced.

It is obvious that it is also possible to use more than two tools at the same time. When doing this, the equilibration of the forces with refer to the direction and amount of the forces must be via the arrangement of the tools one to another, their number and the required task of processing concerned. Also the use of more than two tools is possible in one processing level, e.g. the processing of a wheel of a wheelset, or in two processing levels, e.g. the processing of both wheels of a wheelset at the same time.

As shown in FIG. 1 (variant 1), in order to achieve this aim, two tools at a wheel of a wheelset, i.e. at the same processing level, are used, and to simplify the process, with nearly the same processing task, the working directions in circumference were selected in counterdirection. For the example, the milling cutter 2 with clockwise direction of rotation was selected, and the milling cutter 2' with anti-clockwise direction of rotation. The friction rollers 4 and 4' may drive the wheelset either in clockwise or in anti-clockwise direction.

As shown in FIG. 2 (variant 2), two tools are approached to the wheels of a wheelset, i.e. arranged in two processing levels, and to simplify the process, with nearly the same processing task also the working directions are selected in circumferential direction of the wheel opposite to that and tools producing nearly the same forces.

That is the case with synchronous processing at wheel 1 and wheel 1' of a wheelset with tools running in counterdirection and with the same direction of feed, since it is assumed that with normal wear, the processing tasks and the resulting forces are nearly the same. For the example of preferred embodiment, the milling cutter 2 rotates in clockwise direction, and milling cutter 2' in anti-clockwise direction. The friction rollers 4 and 4' may drive the wheelset either in clockwise direction or in anti-clockwise direction.

That finally permits the reprofilation of a wheelset with more than one rotating tool at each wheel of a wheelset at low cost and reduced total processing time.

According to the kind of the wheelset and the wheelset processing machine concerned, one of the two variants 1 or 2 may preferably be used. The processing tools used are particularly milling cutters rotating in the counterdirection. It goes without saying that also grinding tools may be used.

What is claimed is:

1. A method for processing a wheelset, comprising:

rotating the wheelset about a center of rotation thereof; and applying at least two processing forces to the wheelset at the same time in different directions, wherein moments of said processing forces about the center of rotation are substantially compensated.

2. The method of claim 1, wherein the wheelset is rotated by drive members that frictionally engage the wheelset.

3. A method according to claim 1, characterized in that said at least two processing forces act on the same wheel of the wheelset.

4. A method according to claim 1, characterized in that said at least two processing forces act on different wheels of the wheelset.

5. A wheelset processing apparatus comprising:

drive members for rotating a wheelset about a center of rotation thereof;

at least two rotating processing tools engageable with the wheelset;

said processing tools being disposed to rotate in opposite directions to generate cutting forces acting in opposite directions on at least one wheel of the wheelset.

6. The wheelset processing apparatus of claim 5, wherein said drive members frictionally engage the wheelset.

7. The wheelset processing apparatus of claim 6, wherein said drive members comprise friction rollers.

8. The wheelset processing apparatus of claim 5, wherein said cutting forces act in opposite rotational directions on said at least one wheel.

9. The wheelset processing apparatus of claim 8, wherein said cutting forces generate opposed moments about the center of rotation of the wheelset.

10. The wheelset processing apparatus of claim 9, wherein said opposed moments generated by said processing tools substantially compensate one another.

11. The wheelset processing apparatus of claim 10, wherein said opposed cutting forces are of a substantially similar magnitude.

12. An apparatus according to claim 5, characterized in that there are more than two rotating tools which are so arranged that the total of the cutting forces of all tools rotating in one and the same direction will be approximately equal to the total of the cutting forces of all tools rotating in the opposite direction.

13. An apparatus according to claim 5, characterized in that said rotating tools have a cutting edge disposed thereon.

14. The apparatus of claim 13, wherein said rotating tools comprise milling tools.

15. An apparatus according to claim 5, characterized in that the rotating tools comprise grinding wheels.

* * * * *